US012175572B2

(12) United States Patent
Ren et al.

(10) Patent No.: US 12,175,572 B2
(45) Date of Patent: Dec. 24, 2024

(54) METHOD FOR AUTOMATICALLY GENERATING AN ELECTRONIC CARD BOOK FROM A PHYSICAL CARD BOOK HAVING SCANNABLE CODE

(71) Applicant: DONGGUAN SENGTOR PLASTICS PRODUCTS CO., LTD., Dongguan (CN)

(72) Inventors: Xuefen Ren, Dongguan (CN); Liangfeng Gao, Dongguan (CN); Xiaoshan Feng, Dongguan (CN); Hua Yang, Dongguan (CN)

(73) Assignee: Dongguan Sengtor Plastics Products Co., Ltd., Dongguan (CN)

( * ) Notice: Subject to any disclaimer, the term of this patent is extended or adjusted under 35 U.S.C. 154(b) by 266 days.

(21) Appl. No.: 17/816,072

(22) Filed: Jul. 29, 2022

(65) Prior Publication Data
US 2023/0334738 A1 Oct. 19, 2023

(30) Foreign Application Priority Data

Apr. 19, 2022 (CN) .......................... 202210409374.3

(51) Int. Cl.
*G06T 11/60* (2006.01)
*A63F 1/06* (2006.01)
*G06F 16/903* (2019.01)
*G06K 7/14* (2006.01)

(52) U.S. Cl.
CPC .............. *G06T 11/60* (2013.01); *A63F 1/062* (2013.01); *G06F 16/90344* (2019.01); *G06K 7/1417* (2013.01)

(58) Field of Classification Search
CPC ........ G06T 11/60; A63F 1/062; A63F 13/655; A63F 13/69; A63F 13/73; A63F 13/213; A63F 1/02; A63F 1/06; G06F 16/90344; G06F 16/532; G06F 16/538; G06F 16/54; G06F 16/58; G06K 7/1417; G06K 7/10861; G06K 17/0025
See application file for complete search history.

(56) References Cited

U.S. PATENT DOCUMENTS

| 5,087,145 | A | * | 2/1992 | Cooley | ..................... B42F 5/00 281/38 |
| 5,748,731 | A | * | 5/1998 | Shepherd | ............... G06Q 30/06 705/57 |
| 10,353,997 | B1 | * | 7/2019 | Tobias | ............... G06V 30/1423 |
| 11,030,488 | B1 | * | 6/2021 | Kim | ....................... G06V 10/82 |

(Continued)

*Primary Examiner* — Rami R Okasha
(74) *Attorney, Agent, or Firm* — Inskeep IP Group, Inc.

(57) ABSTRACT

The present disclosure relates to the field of electronic card books, and more particularly, to a method for generating and using an electronic card book, the method may include: at a first step, purchasing a physical card book, at a second step, downloading APP, at a third step, verifying the physical card book, at a fourth step, generating an electronic card book, at a fifth step, generating an electronic card, at a sixth step, searching for electronic cards, and generating the electronic card book by downloading the APP, wherein the electronic card book corresponds to the physical card book, and the same electronic card book as the physical card book can be generated directly by scanning the QR code, the appearance and card format of the electronic card book are consistent with the physical card book.

9 Claims, 2 Drawing Sheets

(56) References Cited

U.S. PATENT DOCUMENTS

| | | | |
|---|---|---|---|
| 2006/0204319 A1* | 9/2006 | Lane | B42F 5/005 |
| | | | 402/73 |
| 2008/0052975 A1* | 3/2008 | Harline | G09F 3/20 |
| | | | 402/4 |
| 2009/0299891 A1* | 12/2009 | Sapir | G06Q 20/123 |
| | | | 705/37 |
| 2018/0075321 A1* | 3/2018 | Tyrrell | G06F 18/217 |
| 2020/0092272 A1* | 3/2020 | Eisen | H04L 63/0869 |
| 2022/0148378 A1* | 5/2022 | Verschoor | G07F 17/3241 |

* cited by examiner

METHOD FOR AUTOMATICALLY GENERATING AN ELECTRONIC CARD BOOK FROM A PHYSICAL CARD BOOK HAVING SCANNABLE CODE

RELATED APPLICATIONS

This application claims the benefit of Chinese Patent Application No. 202210409374.3 filed on Apr. 19, 2022, in the China Intellectual Property Office, the entire disclosure of which is incorporated herein by reference for all purposes.

TECHNICAL FIELD

The disclosure relates to the technical field of electronic card books, and more particularly, to a method for automatically generating an electronic card book from a physical card book having a scannable code.

BACKGROUND

Card game, also known as paper game, is a type of tabletop game. The cards currently circulating in the market have developed into a variety of forms according to people's needs, such as non-collectible card games such as poker, UNO, Tarot and Three Kingdoms, and collectible card games like Magic, King of Games, and Pokemon. The collectible card game, in addition to being played by relatives and friends, also has high artistic value and collection value, and is deeply loved by people.

Currently, game cards are usually stored by card boxes or card books on the market. The card box can accommodate cards stably, but the existing card box generally uses a square box, when the cards are put in, it is difficult to take out the game cards, especially the card name and illustrating picture cannot be seen, which makes it impossible for players to quickly and easily select a specific card in the storage box. The existing card book includes a card book housing and a card book inner component, and the card book inner component is composed of several transparent pages that can be used to place game cards, the game cards can be neatly placed in a corresponding card grid on the transparent page, and the information of various game cards can be easily viewed by turning the transparent page. When the number of game cards and card books is large, it is difficult to systematically classify and arrange them, and it is not convenient to find a specific game cards. The user needs to find the corresponding card book and turn the pages continuously to finally find the desired game card, thus the overall operation being inconvenient and increasing the time to find the game card, at the same time, the card box and card book being inconvenient to display game cards quickly, thereby negatively affecting social.

SUMMARY

The purpose of the present disclosure is to solve the above defects, and to provide a method for automatically generating and using an electronic card book from a physical card book having a scannable code, which can quickly generate an electronic card book, and generate electronic cards consistent with physical cards, thereby being convenient for users to quickly find the card.

The object of the present disclosure is achieved in the following ways:

A method for automatically generating an electronic card book from a physical card book having a scannable code is provided, which includes:

at a first step, purchasing the physical card book, which comprising a card book housing and a card book inner component, wherein the card book inner component consists of several transparent pages that is configured to place physical cards, a QR code is printed on the card book housing and records information of the physical card book, and a display area for placing the physical cards is arranged on the transparent pages;

at a second step, downloading APP, and using an electronic device to download the APP, wherein the APP is configured to generate the electronic card book, after the APP is downloaded, installing the APP on the electronic device according to a prompt, and then registering personal information according to requirements of a guide, and logging in the APP based on the recently registered personal information;

at a third step, verifying the physical card book, clicking an APP camera option, turning on a camera, scanning the QR code on the card book housing, verifying a number of times the QR code has been scanned, wherein when the number of times the QR code has been scanned is verified to be 0, proceeding to a next step, wherein when the number of times the QR code has been scanned is verified to be 1, giving feedback to remind a user that the QR code is invalid;

at a fourth step, generating the electronic card book, wherein after successful verification by scanning the QR code at the third step, the APP automatically generates the electronic card book having information that is consistent with the information of the physical card book, and wherein the electronic card book comprises electronic page flips, and display areas for placing electronic cards in the electronic card book are arranged on the electronic page flips;

at a fifth step, generating electronic cards, in response to the user clicking one display area in the electronic card book to add one corresponding electronic card, photographing, by the user, the physical card at a position where the physical card is stored on the physical card book, and saving a photograph of the physical card in response to the user clicking a save option after the photographing is completed, to generate the corresponding electronic card, wherein a position where the electronic card is stored on the electronic card book corresponds to the position where the physical card is stored on the physical card book, and first detailed information displayed by the corresponding electronic card generated in the electronic card book is consistent with second detailed information of a corresponding physical card, and wherein the fifth step is repeated until all electronic cards corresponding to the physical cards are generated;

at a sixth step, searching for the electronic cards, entering a keyword of the electronic card to be searched at a search bar on a homepage of the APP, and thus searching for the corresponding electronic card, and clicking the electronic card to display card information of the electronic card.

Further, the card information comprises card shape, card name, remark information, storage time and storage position.

Further, the information of the physical card book comprises a color of the physical card book, a name of the physical card book, a number of transparent pages and a number of display areas for placing the physical cards.

Further, at the second step, the APP is capable of one of: being downloaded by scanning a QR code link, and being searched and downloaded directly from an application platform.

Further, a number of display areas is set to one of: 4, 9, 12 and 16.

Further, at the fifth step, the photographing step is performed by one of:
photographing in advance by the electronic device and saving the photograph in a photo album of the electronic device, and the saved photograph in the photo album of the electronic device is uploaded according to an APP pop-up prompt,
online real-time photographing the physical card according to an APP pop-up prompt.

Further, at the fifth step, after the physical card is photographed, the APP has a photo correction function, which corrects a photographed photo, the corrected photo finally generated is the electronic card, and wherein the electronic card is displayed on a corresponding display area in the electronic card book, and the information of the photographed physical card is automatically recognized, and finally the card information of the recognized physical card is automatically generated.

Further, in the fifth step, after photographing the physical card, the APP recognizes the physical card through a back-end of the APP, and automatically generate a same electronic card as the physical card photographed, and display the electronic card on a corresponding display area in the electronic card book, and finally the card information of the electronic card corresponding to the physical card is automatically generated.

Further, at the sixth step, the keyword is input by at least one of text and voice.

The beneficial effects of the present disclosure are: the electronic card book is generated by downloading the APP, the electronic card book corresponds to the physical card book, the same electronic card book as the physical card book can be generated directly by scanning the QR code, the appearance and card format of the electronic card book are consistent with the physical card book, thereby being convenient to quickly find the corresponding physical card book, at the same time, user can directly generate the same electronic card as the physical card on the APP by taking a photo. After generating the electronic card, user can click to view the relevant information of the electronic card at any time, after all electronic cards and electronic card books are generated, all information of any corresponding physical card book can be directly found on the APP, thereby being convenient for users to quickly find the desired physical card through the APP, user can directly search for the electronic card to display in the APP and find the specific position of the corresponding physical card, determine the physical card book corresponding to the physical card and the location of the corresponding transparent page flip, so that users can quickly and accurately find the physical card they are looking for, thereby the overall operation being simple, and being convenient to quickly generate various electronic card books and electronic cards, and thus a large number of electronic card books can be stored, clearly classified, thereby saving the time for users to find physical cards, the storage position of physical cards can be accurately determined, and a display effect is achieved, thereby increasing the fun of card games, and improving social attributes.

BRIEF DESCRIPTION OF THE DRAWINGS

Reference numbers:
In FIG. 1, 1-card book housing, 2-card book inner component, 3-QR code, 4-transparent page, 5-display area;
In FIG. 2, the blocks with white background are active operation steps, and the blocks with gray background are system operation steps.

DETAILED DESCRIPTION

The present disclosure will be described in further detail below with reference to the accompanying drawings and specific embodiments.

Figure 1:
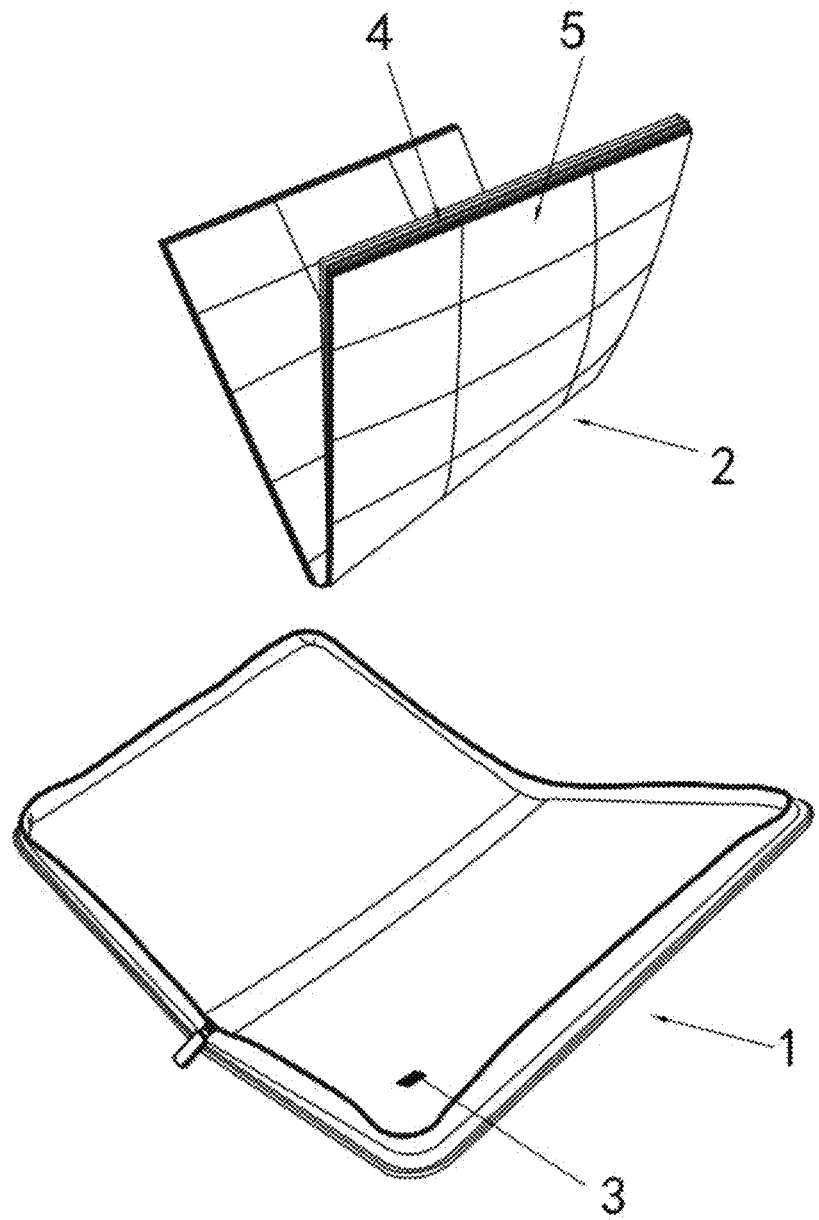
FIG. 1 is a structural schematic diagram of the physical card book according to a method for automatically generating the electronic card book from a physical card book having a scannable code of the present disclosure.
Figure 2:
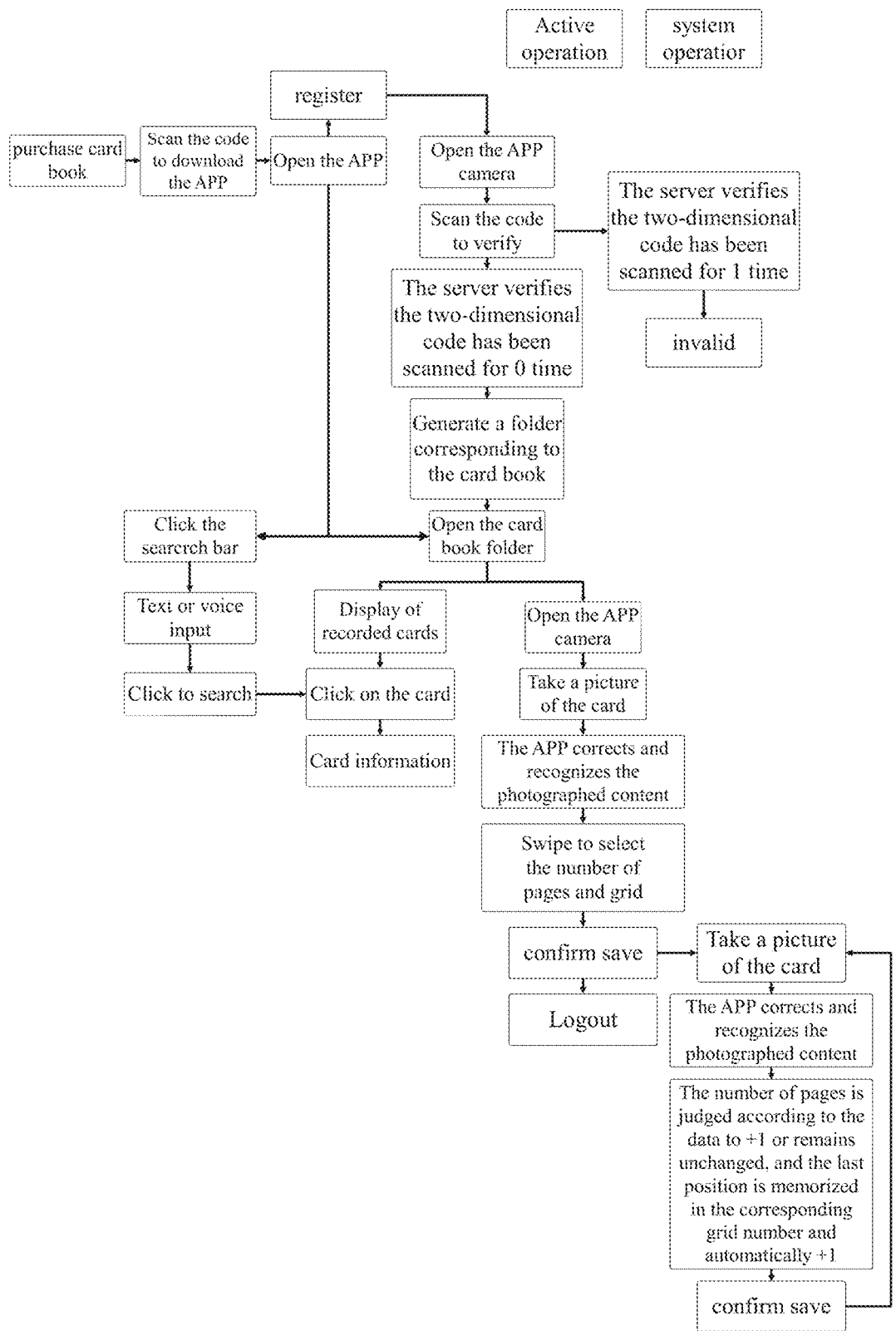
FIG. 2 is a flow chart of the method for automatically generating the electronic card book from a physical card book having a scannable code of the present disclosure.

Referring to FIG. 1 and FIG. 2, a method for automatically generating an electronic card book from a physical card book having a scannable code includes the following described steps.

At a first step, purchasing or providing the physical card book which comprises a card book housing 1 and a card book inner component 2, as shown in FIG. 1. The card book inner component 2 consists of several transparent pages 4 that can be is configured to place physical cards, a two-dimensional code (commonly known as QR code) 3 is printed on the card book housing and records information of the physical card book, the information of the physical card book includes a color of the physical card book, a name of the physical card book, a number of transparent pages and a number of display areas for placing the physical cards, a number of display areas may be set to 4 or 9 or 12 or 16, the number of display areas in this embodiment is 12, and the display areas 5 for placing the physical cards are arranged on the transparent page.

At a second step, providing or downloading an APP, and using an electronic device to download the APP, the APP can be downloaded by scanning a QR code link, or the APP can be searched and downloaded directly from an application platform. The APP is configured to generate an electronic card book, after the APP is downloaded, installing the APP on the electronic device according to a prompt, and then registering personal information according to requirements of a guide, and logging in the APP based on the registered personal information.

At a third step, verifying the physical card book, clicking an APP camera option to enable a camera to scan the QR code on the card book housing, verifying a number of times the QR code has been scanned, wherein when the number of times the QR code has been scanned is verified to be 0, proceeding to a next step, when the number of times the QR code has been scanned is verified to be 1, giving feedback to remind a user that the QR code is invalid.

At a fourth step, generating the electronic card book, wherein after the successful verification by scanning the QR code at the third step, the APP automatically generates the electronic card book having information that is consistent with the information of physical card book, and wherein the electronic card book comprises electronic page flips (or pages), and display area for placing electronic cards in the electronic card book are arranged on the electronic page flips.

At a fifth step, generating an electronic card, in response to the user clicking one display area in the electronic card book to add one electronic card, photographing, by the user, the physical card at a position where the physical card is stored on the physical card book, and saving a photograph of the physical card (e.g. by clicking "Save" option) after the photographing is completed, to generate the corresponding electronic card. Wherein a position where the electronic card is stored on the electronic card book corresponds to the position where the physical card is stored on the physical card book, and first detailed information displayed by the corresponding electronic card generated in the electronic card book is consistent with second detailed information of a corresponding physical card, and wherein the fifth step is repeated until all electronic cards corresponding to the physical cards are generated. The user can determine the desired page or page flip and the desired display area corresponding to the location of the physical card, after determining the location of the electronic card, the user may select the photo and save it.

At the fifth step, the photographing step can be performed in such a manner that the electronic device photographs in advance and saves one or more photographs in a photo album of the electronic device, and the saved photographs of the one or more physical cards in the photo album of the electronic device are uploaded according to an APP pop-up prompt. In another embodiment, the photographing step can be performed by online real-time photographing the physical card according to an APP pop-up prompt.

At the fifth step, after photographing the physical cards and generating the corresponding electronic cards, the page number of the current electronic page may be increased by 1 (e.g., "2" to "3") or remain the same, depending on the actual situation. If all the display areas on the current page are occupied by the generated electronic cards, the page number will be automatically increased by 1. If the display areas of the current page are not fully occupied by the electronic cards, the display area number of the recently used display area will be automatically increased by 1, so that the next display area where the user need to add new electronic card will be shown for the user's operation. After all the electronic cards are generated, the user can click to save.

At the fifth step, after photographing the physical cards and generating the corresponding electronic cards, the page number of the current electronic page may be increased by 1 (e.g., "2" to "3") or remain the same, depending on the actual situation. If all the display areas on the current page are occupied by the generated electronic cards, the page number will be automatically increased by 1. If the display areas of the current page are not fully occupied by the electronic cards, the display area number of the recently used display area will be automatically increased by 1, so that the next display area where the user needs to add new electronic card will be shown for the user's operation. After all the electronic cards are generated, the user can click to save.

At the fifth step, after the physical card is photographed, the APP has a photo correction function for correcting or modifying a photographed photo, the corrected photo (if presented) is the electronic card which is to be displayed on a corresponding display area in the electronic card book, and the information of the photographed physical card is automatically recognized, so that the card information of the recognized physical card is automatically generated correspondingly.

At the fifth step, after photographing the physical cards, the APP recognizes the physical card through a backend of the APP, and automatically generate a same electronic card as the physical card photographed, and display the electronic card on a corresponding display area in the electronic card book, and finally the card information of the electronic card corresponding to the physical card is automatically generated.

At a sixth step, searching for electronic cards, wherein entering the keywords of the electronic cards to be searched at the search bar on the APP homepage, wherein the keyword is input by text, or the keyword can be input by voice, the user can search for the corresponding electronic card, click the electronic card to display the card information of the electronic card, the card information includes the card shape, card name, remark information, storage time and storage position.

The above content is a further detailed description of the present disclosure in conjunction with specific preferred embodiments, and it cannot be considered that the specific implementation of the present disclosure is limited to these descriptions. For those of ordinary skill in the technical field to which the present disclosure belongs, without departing from the concept of the present disclosure, some simple deductions or substitutions can be made, which should fall into the protection scope of the present disclosure.

What is claimed is:

1. A method for automatically generating an electronic card book from a physical card book having a scannable code, comprising:
   at a first step, providing the physical card book which comprises a card book housing and a card book inner component,
   wherein the card book inner component consists of several transparent pages that is configured to place physical cards, and a QR code is printed on the card book housing and records information of the physical card book, and display areas for placing the physical cards are arranged on the transparent pages;
   at a second step, providing an APP, and using an electronic device to download the APP;
   wherein the APP is configured to generate the electronic card book, after the APP is downloaded, installing the APP on the electronic device according to a prompt, and then registering personal information according to requirements of a guide, and logging in the APP based on the registered personal information;
   at a third step, verifying the physical card book, clicking an APP camera option to enable a camera to scan the QR code on the card book housing, verifying a number of times the QR code has been scanned,
   wherein when the number of times the QR code has been scanned is verified to be 0, proceeding to a next step, when the number of times the QR code has been scanned is verified to be 1, giving feedback to remind a user that the QR code is invalid;
   at a fourth step, generating the electronic card book,
   wherein after successful verification by scanning the QR code at the third step, the APP automatically generates the electronic card book having information that is consistent with the information of the physical card book, and wherein the electronic card book comprises electronic page flips, and display areas for placing electronic cards in the electronic card book are arranged on the electronic page flips;

at a fifth step, generating electronic cards in response to the user clicking one display area in the electronic card book to add one corresponding electronic card; photographing, by the user, the physical card at a position where the physical card is stored on the physical card book; and saving a photograph of the physical card in response to the user clicking a save option after the photographing is completed to generate the corresponding electronic card;

wherein a position where the electronic card is stored on the electronic card book corresponds to the position where the physical card is stored on the physical card book, and first detailed information displayed by the corresponding electronic card generated in the electronic card book is consistent with second detailed information of a corresponding physical card, and wherein the fifth step is repeated until all electronic cards corresponding to the physical cards are generated; and at a sixth step, searching for the electronic cards, entering a keyword of the electronic card to be searched at a search bar on a homepage of the APP, and thus searching for the corresponding electronic card, and clicking the electronic card to display card information of the electronic card.

2. The method of claim 1, wherein the card information comprises card shape, card name, remark information, storage time and storage position.

3. The method of claim 1, wherein, the information of the physical card book comprises a color of the physical card book, a name of the physical card book, a number of transparent pages and a number of display areas for placing the physical cards.

4. The method of claim 1, wherein, at the second step, the APP is capable of at least one of:
being downloaded by scanning a QR code link, and
being searched and downloaded directly from an application platform.

5. The method of claim 1, wherein, a number of display areas is set to one of: 4, 9, 12 and 16.

6. The method of claim 1, wherein, at the fifth step, the photographing is performed by one of:
photographing in advance by the electronic device and saving the photograph in a photo album of the electronic device, and the saved photograph in the photo album of the electronic device is uploaded according to an APP pop-up prompt,
online real-time photographing the physical card according to an APP pop-up prompt.

7. The method of claim 1, wherein, at the fifth step, after the physical card is photographed, the APP has a photo correction function, which corrects a photographed photo, the corrected photo finally generated is the electronic card, and wherein the electronic card is displayed on a corresponding display area in the electronic card book, and the information of the photographed physical card is automatically recognized, and finally the card information of the recognized physical card is automatically generated.

8. The method of claim 1, wherein, in the fifth step, after photographing the physical card, the APP recognizes the physical card through a backend of the APP, and automatically generate a same electronic card as the physical card photographed, and display the electronic card on a corresponding display area in the electronic card book, and finally the card information of the electronic card corresponding to the physical card is automatically generated.

9. The method of claim 1, wherein, at the sixth step, the keyword is input by at least one of text and voice.

* * * * *